(12) United States Patent
Gonzales et al.

(10) Patent No.: US 8,205,818 B1
(45) Date of Patent: Jun. 26, 2012

(54) STRAP WINDER

(76) Inventors: Joseph Paul Gonzales, Chubbuck, ID (US); Donna L. Gonzales, Chubbuck, ID (US); Fernando B. Gonzales, Pocatello, ID (US)

( * ) Notice: Subject to any disclaimer, the term of this patent is extended or adjusted under 35 U.S.C. 154(b) by 0 days.

(21) Appl. No.: 13/190,002

(22) Filed: Jul. 25, 2011

Related U.S. Application Data

(62) Division of application No. 12/757,728, filed on Apr. 9, 2010, now Pat. No. 7,984,870.

(60) Provisional application No. 61/168,583, filed on Apr. 11, 2009.

(51) Int. Cl.
*B65H 75/38* (2006.01)

(52) U.S. Cl. ............ 242/404.1; 242/405; 242/586; 242/587.2

(58) Field of Classification Search .... 242/404.1–404.2, 242/405, 405.1–405.3, 406, 407, 586, 587.2
See application file for complete search history.

(56) References Cited

U.S. PATENT DOCUMENTS

| | | | | |
|---|---|---|---|---|
| 1,359,021 | A | * | 11/1920 | Blair ................ 242/533.7 |
| 2,571,175 | A | | 10/1949 | Williams et al. |
| 3,258,220 | A | * | 6/1966 | Munger ............. 242/404.1 |
| 3,637,158 | A | * | 1/1972 | Jacobsen ............ 242/404.1 |
| 3,731,887 | A | | 5/1973 | Wheeler |
| 3,954,226 | A | | 5/1976 | Pickering |
| 4,007,887 | A | | 2/1977 | Vice |
| 4,266,740 | A | | 5/1981 | Ramos et al. |
| 4,311,288 | A | | 1/1982 | Galland |
| 4,390,141 | A | | 6/1983 | Webster |
| 4,693,432 | A | | 9/1987 | Tourret |
| 4,892,265 | A | * | 1/1990 | Cox ................ 242/539 |
| 5,791,844 | A | | 8/1998 | Anderson |
| 5,975,454 | A | | 11/1999 | Potter et al. |
| D452,953 | S | | 1/2002 | Okkema |
| 6,398,147 | B1 | | 6/2002 | Fredrickson |
| 6,398,470 | B1 | | 6/2002 | Mosley |
| 7,017,847 | B2 | | 3/2006 | Treat |
| 7,059,588 | B2 | | 6/2006 | Goulet |

FOREIGN PATENT DOCUMENTS

| | | |
|---|---|---|
| JP | 2004-196508 A | 7/2004 |
| JP | 2005-022867 A | 1/2005 |
| KR | 20-0383660 Y1 | 5/2005 |
| KR | 20-0407859 Y1 | 2/2006 |
| KR | 10-2008-0085130 A | 9/2008 |

* cited by examiner

*Primary Examiner* — Sang Kim
(74) *Attorney, Agent, or Firm* — Kenneth L. Green

(57) ABSTRACT

A strap and cord winder is adjustable for different width straps and reconfigurable for cords. The winder includes a handle assembly with a center shaft and an offset pin for engaging and winding a strap. The center shaft adjustably passes through a face plate creating an adjustable width between a handle arm of the handle assembly and the face plate for winding different width straps. A cylindrical grip is attached to the face plate opposite the handle arm and the face plate attaches to a chest plate. A spool may be positioned on the center shaft between the handle arm and face plate for coiling cords and hoses and the offset pin engages a notch on one end of the spool to couple rotation of the handle to rotation of the spool. The spool includes disks at each end including open ended slots reaching radially to capture cord ends.

7 Claims, 10 Drawing Sheets

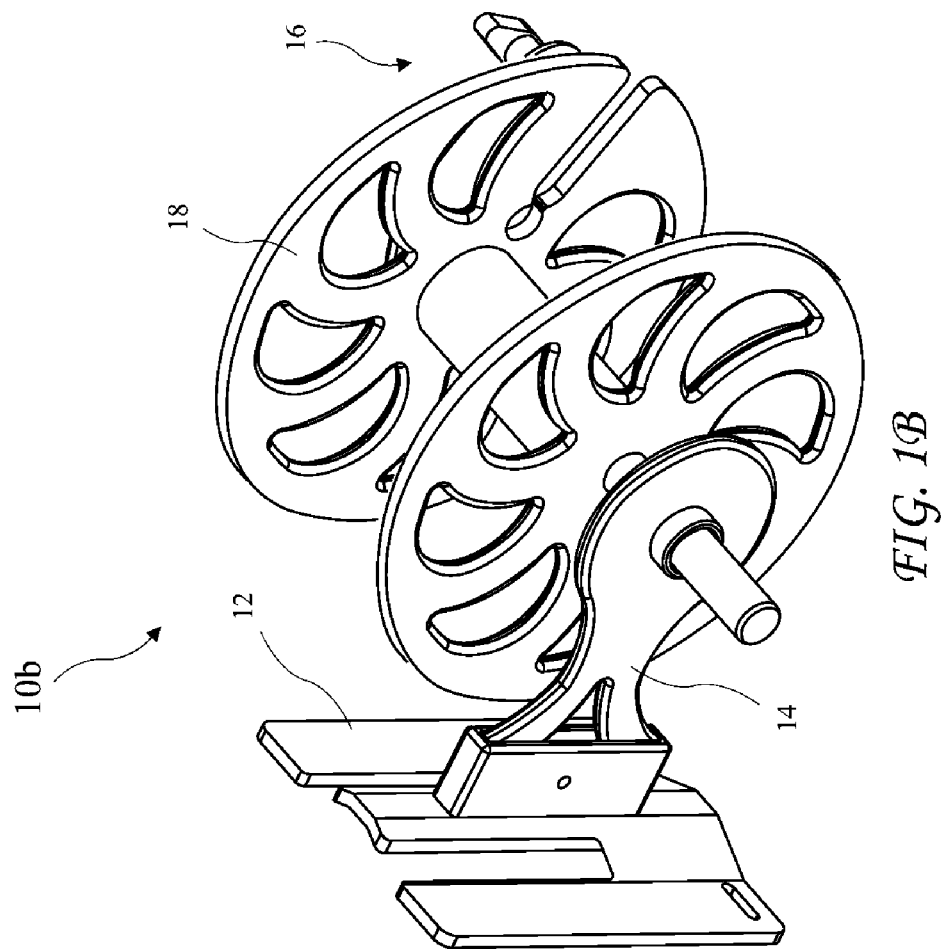
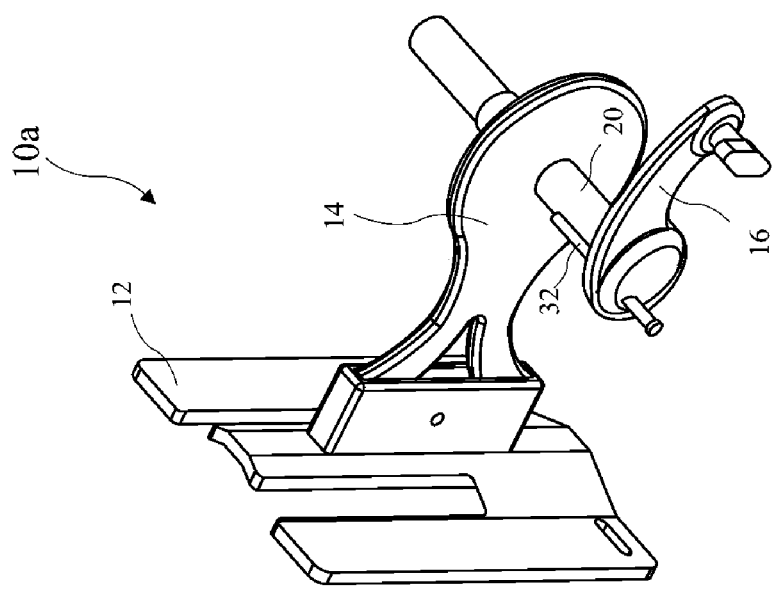
FIG. 1B
FIG. 1A

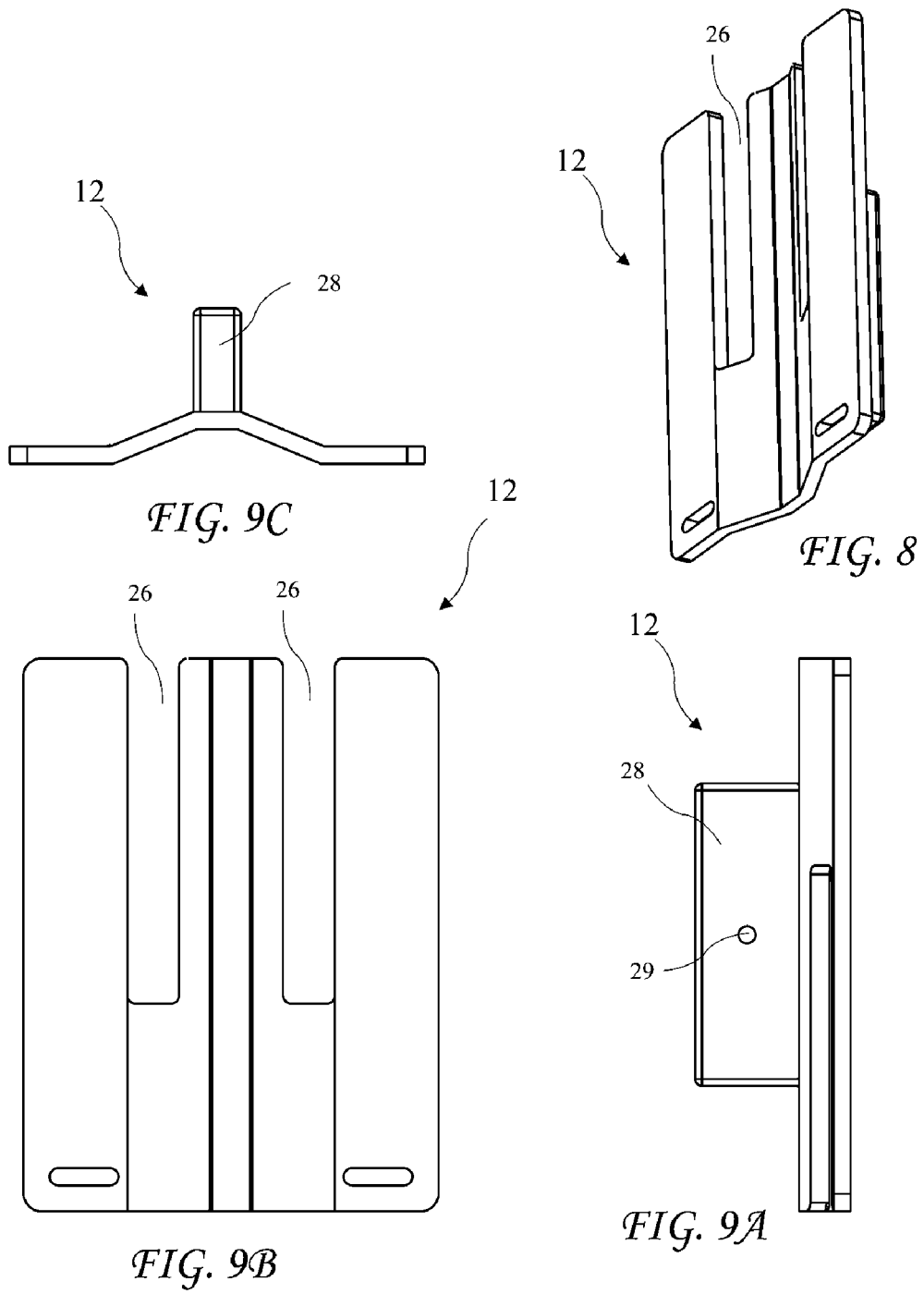

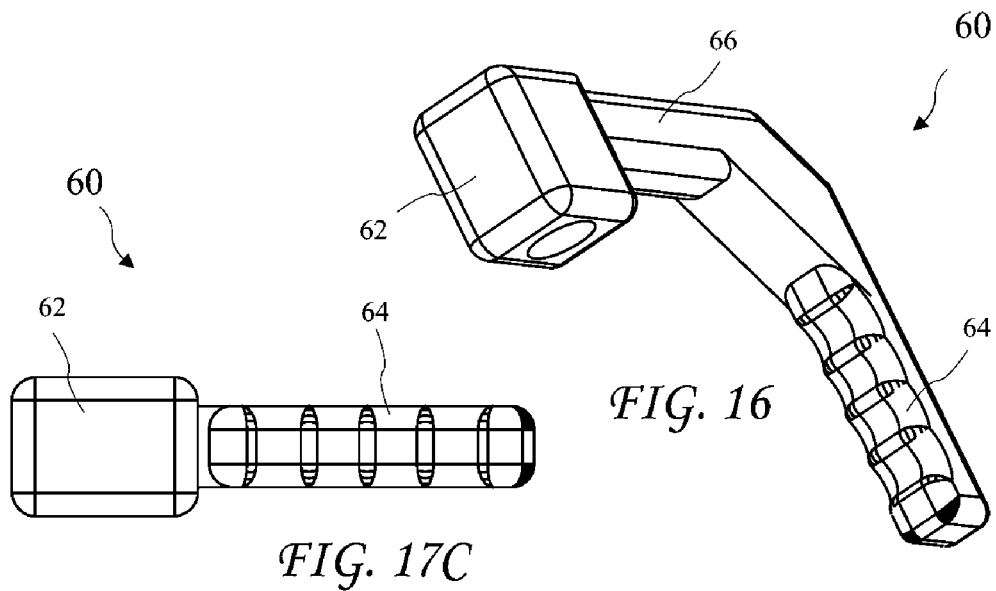
FIG. 16
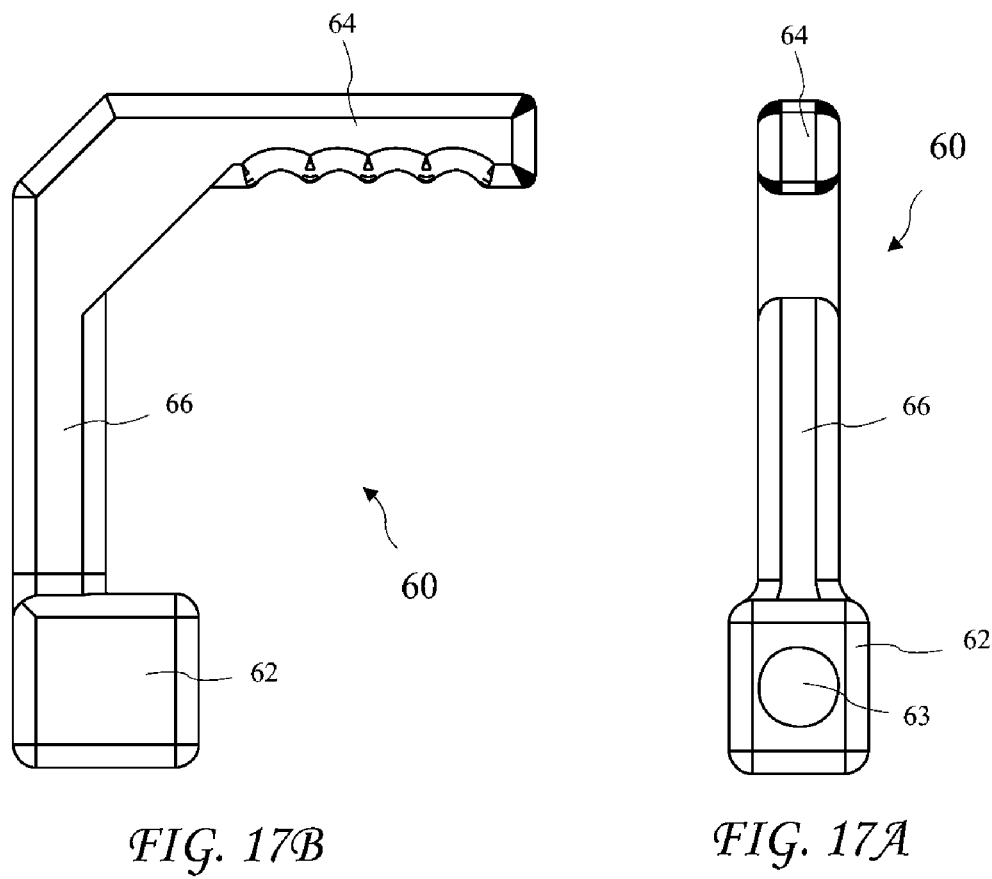
FIG. 17C
FIG. 17B
FIG. 17A

STRAP WINDER

The present application claims the priority of U.S. Provisional Patent Application Ser. No. 61/168,583 filed Apr. 11, 2009 and U.S. patent application Ser. No. 12/757,728 filed Apr. 9, 2010 which applications are incorporated in their entirety herein by reference.

BACKGROUND OF THE INVENTION

The present invention relates to straps used to hold down cargo on trucks or trailers, and in particular to a cranking apparatus for winding straps or cords after use.

Straps are commonly used to hold cargo in place on trucks, trailers, and for cargo holding in general. The straps are various widths from one inch to six inches and various lengths. Often, upon unloading cargo, users are faced by long lengths of the straps which may be exposed to dirt, mud, snow, water, and the like, and require coiling for storage. No tools are available for easy coiling of the straps.

Further, because known straps come in various widths, know strap winders often produce loose coils or fail to produce a single coil. Tangled straps may result requiring time to prepare the straps for later use.

BRIEF SUMMARY OF THE INVENTION

The present invention addresses the above and other needs by providing a strap and cord winder which is adjustable for different width straps and reconfigurable for cords. The strap winder includes a handle assembly with a center shaft and an offset pin for engaging and winding a strap end. The center shaft adjustably passes through a face plate creating an adjustable width between a handle arm and the face plate for winding different width straps. A cylindrical grip is attached to the face plate opposite the handle assembly and the face plate attaches to a chest plate. A spool may be positioned between the handle arm and the face plate for coiling cords and hoses, and the offset pin engages a notch on one end of the spool to couple rotation of the handle arm to rotation of the spool. The spool includes disks at each end including open ended slots reaching radially to capture cord ends. The chest plate may be carried by an upper torso harness about even with the user's chest, or may engage the user's pants belt about even with a user's waist, for easy use.

In accordance with one aspect of the invention, there is provided a strap winder. The strap winder includes a center shaft, a handle assembly attached to the center shaft, a sliding pin residing parallel to the center shaft and also attached to the handle assembly, a face plate opposite the handle assembly, a grip attached to the face plate and residing over the center shaft extending opposite to the handle assembly and a harness plate attached to an upper torso wearable harness and attached to the face plate for carrying the strap winder during use.

In accordance with another aspect of the invention, there is provided a spool which may be placed on the center shaft residing between the handle arm and the face plate. The sliding pin engages a notch in the spool to turn the spool with the handle arm. Installation of the spool allows the strap winder to be used for coiling cords and hoses.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a perspective view of a strap winder according to the present invention.

FIG. 1B is a perspective view of a cord winder according to the present invention.

FIG. 8 is a perspective view of a chest plate according to the present invention.

FIG. 9A is a front view of the chest plate according to the present invention.

FIG. 9B is a side view of the chest plate according to the present invention.

FIG. 9C is a top view of the chest plate according to the present invention.

FIG. 16 is a perspective view of an unwinding handle according to the present invention.

FIG. 17A is a side view of the unwinding handle according to the present invention.

FIG. 17B is an end view of the unwinding handle according to the present invention.

FIG. 17C is a top view of the unwinding handle according to the present invention.

Corresponding reference characters indicate corresponding components throughout the several views of the drawings.

DETAILED DESCRIPTION OF THE INVENTION

Figure 3C:
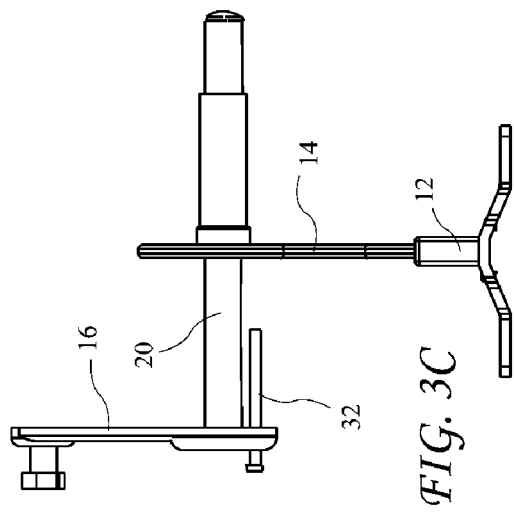
FIG. 3C is a top view of the strap winder according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A perspective views of a multi use strap and cord winder according to the present invention, configured as a strap winder 10a is shown in FIG. 1A, and configured as a cord winder 10b in FIG. 1B. The multi use strap and cord winder uses a common chest plate 12, face plate 14, and handle assembly 16. The chest plate 12 is worn by a user and the face plate 14 is orthogonally attached to the chest plate 12. The handle assembly 16 includes a center shaft 20 passing through the face plate 14 to provide the strap winder 10a and a spool 18 is added for the cord winder 10b. A tubular handle 22 (see FIG. 6) is fixedly attached to the face plate 14 for grasping by the user during winding of a strap or cord.

Figure 3A:
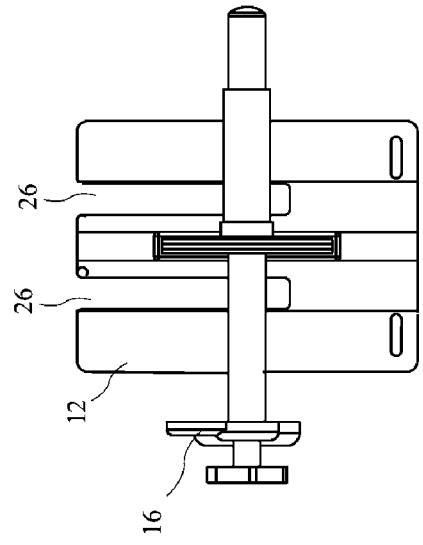
FIG. 3A is a front view of the strap winder according to the present invention.
Figure 2:
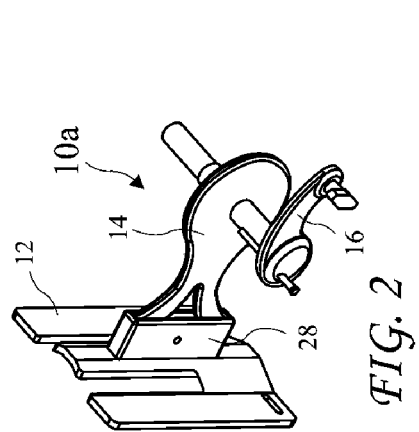
FIG. 2 is a second perspective view of the strap winder according to the present invention.
Figure 3B:
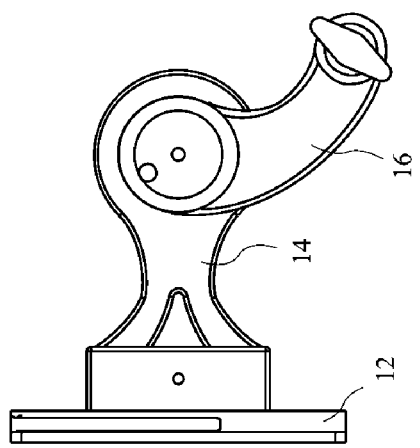
FIG. 3B is a side view of the strap winder according to the present invention.

A second perspective view of the strap winder 10a is shown in FIG. 2, a front view of the strap winder 10a is shown in FIG. 3A, a side view of the strap winder 10a is shown in FIG. 3B, and a top view of the strap winder 10a is shown in FIG. 3C. The strap winder 10a includes the chest plate 12 which includes slots 26 for attachment to a belt, harness, or the like for carrying by a user. The face plate 14 is attached to a female extension 28 of the chest plate 12. The face plate 14 includes a bushing 24 and tubular handle 22. The bushing 24 receives a center shaft 20 attached to the handle assembly 16 and the center shaft 20 reaches through and past the tubular handle 22. A sliding pin 32 of the handle assembly 16 reaches parallel with the center shaft 20 towards the face plate 14 and may be used to hold the end of a strap which is being wound around the center shaft 20. The depth of the sliding pin 32 is adjustable to allow adjustment of the separation of the handle assembly 16 from the face place 14 for different width straps.

Figure 4:
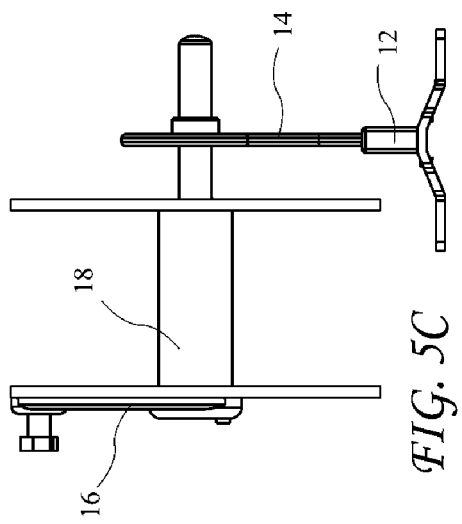
FIG. 4 is a second perspective view of the cord winder according to the present invention.
Figure 5B:
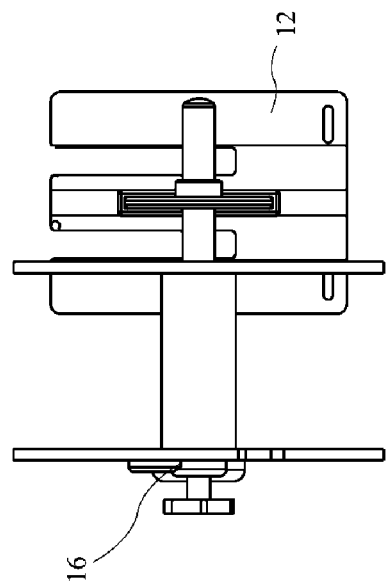
FIG. 5B is a side view of the cord winder according to the present invention.
Figure 5C:
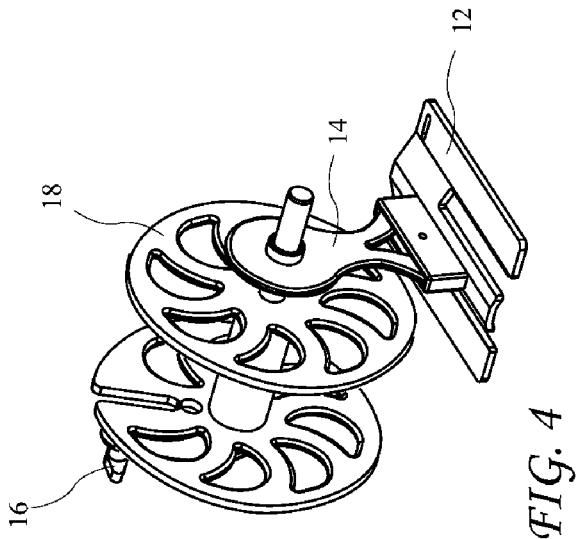
FIG. 5C is a top view of the cord winder according to the present invention.
Figure 5A:
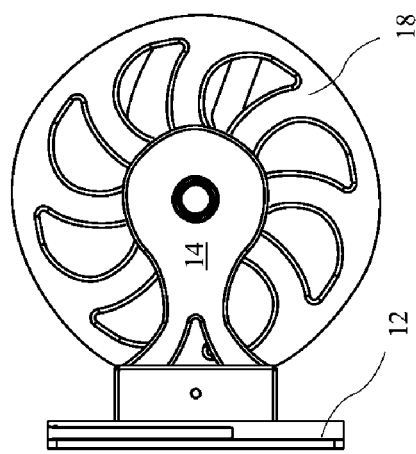
FIG. 5A is a front view of the cord winder according to the present invention.

A second perspective view of the cord winder 10b is shown in FIG. 4, a front view of the cord winder 10b is shown in FIG. 5A, a side view of the cord winder 10b is shown in FIG. 5B, and a top view of the cord winder 10b is shown in FIG. 5C. The cord winder 10b is configured similar to the strap winder 10a, with an exception that a spool 18 resides between handle assembly 16 and face plate 14. The spool 18 facilitates convenient winding of cords and is described in more detail below.

Figure 6:
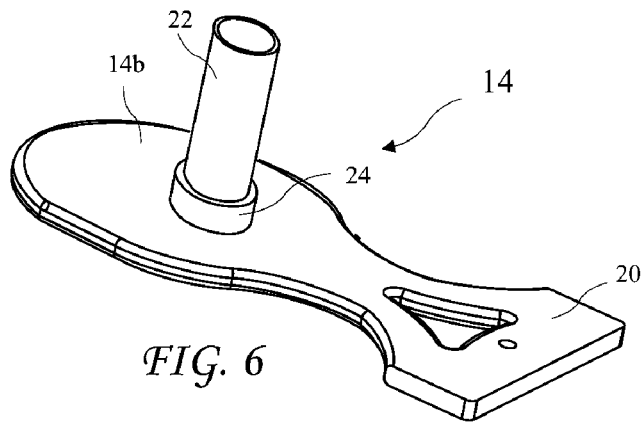
FIG. 6 is a perspective view of a face plate according to the present invention.
Figure 7C:
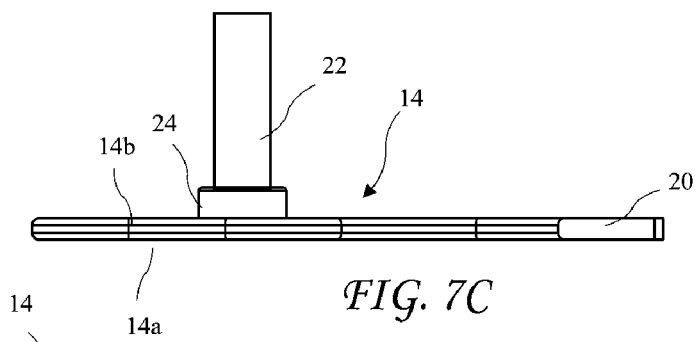
FIG. 7C is a top view of the face plate according to the present invention.
Figure 7B:
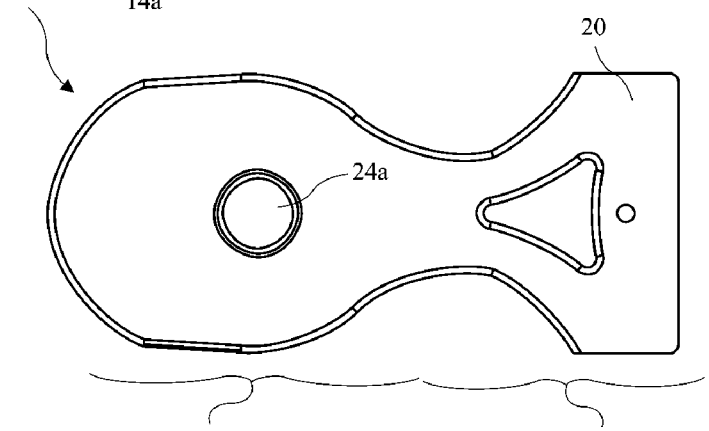
FIG. 7B is a front view of the face plate according to the present invention.
Figure 7A:
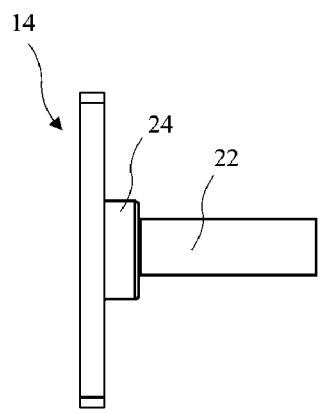
FIG. 7A is a side view of the face plate according to the present invention.

A perspective view of the face plate 14 according to the present invention is shown in FIG. 6, a side view of the face plate 14 is shown in FIG. 7A, a front view of the face plate 14 is shown in FIG. 7B, and a top view of the face plate 14 is shown in FIG. 7C. The face plate 14 includes a base 20 for attaching to the chest plate 12, the bushing 24 for receiving the center shaft 20, and the tubular handle 22. The face plate 14 has an inward facing face 14a and an outward facing face 14b opposite to the inward facing face 14a. The inward facing face 14a provides a boundary for either a strap wound onto the strap winder 10a or for the spool 18. The faces 14a and 14b preferably are round or oval portions 13a with an attachment portion 13b extending from one side of the faces 14a and 14b. The bushing 24 includes a passage 24a having a centerline approximately orthogonal to the inside face 14a. An example of a suitable tubular handle 22 is a three inch long piece of one inch PVC.

The face plate 14 has a length of preferably approximately eight inches, a circular portion has a diameter of preferably approximately four inches, and a thickness of preferably approximately 5/16 inches. The bushing 24 has an outside diameter of preferably approximately 1¼ inches, an inside diameter of preferably approximately one inch and reaches a distance of preferably approximately 7/16 inches from the face plate 14. The base 20 is preferably rectangular and has a width of preferably approximately four inches and a height of preferably approximately 1½ inches.

A perspective view of the chest plate 12 according to the present invention is shown in FIG. 8, a front view of the chest plate 12 is shown in FIG. 9A, a side view of the chest plate 12 is shown in FIG. 9B, and a top view of the chest plate 12 is shown in FIG. 9C. The chest plate 12 includes two slots 26 allowing a belt, a harness, or the like to engage the chest plate 12 to carry the chest plate 12 near the user's chest or waist. A female extension 28 reaches out from the chest plate 12 for attachment of the face plate 14 to the chest plate 12. While the chest plate 12 is a preferred apparatus for holding the face plate, any winder having the functionality of the winders 10a and/or 10b having any apparatus for carrying the winder is intended to come within the scope of the present invention. The face plate 14 is preferably attached to the chest plate 12 by a single fastener, for example, a screw, or a cotter pin, a spring loaded detent, or the like, passing through holes 29 in the female extension 28 and through the base 20 of the face plate 14.

The chest plate 12 is preferably approximately six inches wide, eight inches high, and ¼ inches thick. The slots 26 are preferably approximately five inches deep and ¾ inches wide. The female extension 28 is preferably rectangular and has a height of preferably approximately 1½ inches and a length of preferably approximately 4⅜ inches. While a chest plate is herein disclosed having two slots for engaging a belt or harness, other chest plates may include closed slots, hooks, rings, screws, or the like for attaching the chest plate to a belt or harness, and a winder according to the present invention having any means for attaching a chest plate to a belt or harness is intended to come within the scope of the present invention.

Figure 10:
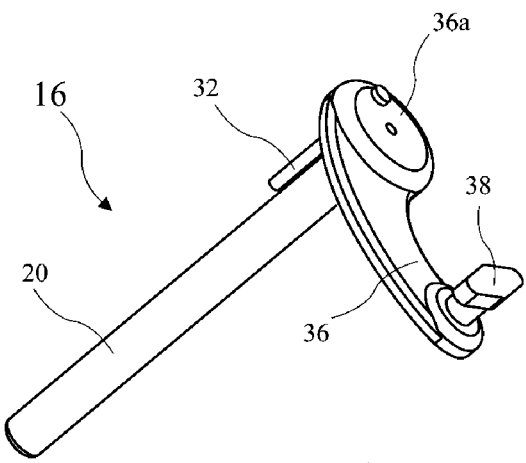
FIG. 10 is a perspective view of a handle assembly according to the present invention.
Figure 11C:
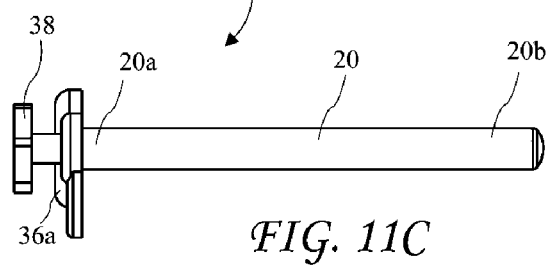
FIG. 11C is a top view of the handle assembly according to the present invention.
Figure 11A:
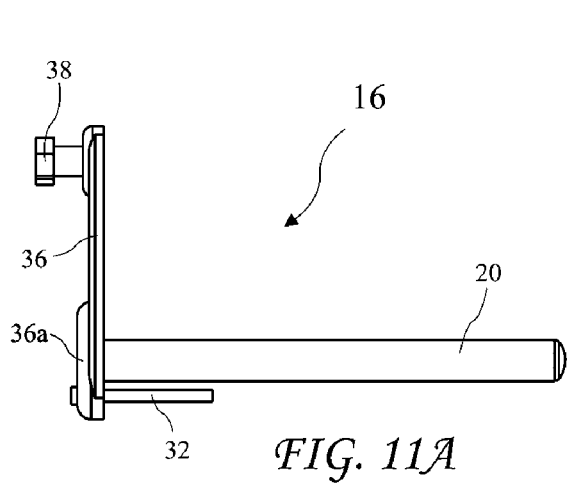
FIG. 11A is a front view of the handle assembly according to the present invention.
Figure 11B:
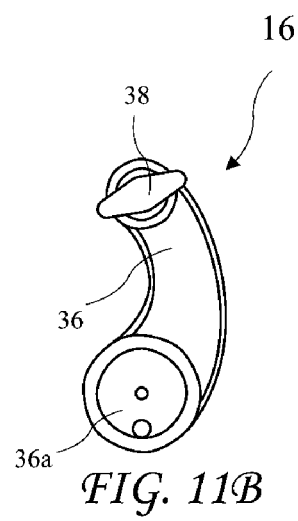
FIG. 11B is a side view of the handle assembly according to the present invention.

A perspective view of a handle assembly 16 according to the present invention is shown in FIG. 10, a front view of the handle assembly 16 is shown in FIG. 11A, a side view of the handle assembly 16 is shown in FIG. 11B, and a top view of the handle assembly 16 is shown in FIG. 11C. The handle assembly 16 includes the center shaft 20, the sliding pin 32 reaching parallel to the center shaft 20, an arm 36, a knob 38. The center shaft has a proximal end 20a next to the arm 36 and a distal end 20b opposite the proximal end 20a for insertion through the bushing 24 and tubular handle 22. The proximal end 20a of the center shaft 20 is attached to the arm 36. The arm 36 includes a shaft end 36a with increased thickness to attach to the center shaft 20. The shaft end 36a is preferably approximately ¾ inches thick and has an internal bore sized for an interference fit to the center shaft 20. The sliding pin 32 slides through the arm 36 at the shaft end 36a, facilitating adjustment of the width of the strap winder 10a.

The center shaft 20 is preferably approximately ⅞ inches in diameter and preferably approximately ten inches long and may be made from, for example, ⅞ inch PVC schedule 40 pipe. The sliding pin 32 is preferably approximately ¼ inches in diameter and preferably approximately 3.5 inches long and is preferably offset from the center shaft 20 by approximately ¾ inches. The centerlines of the center shaft 20 and sliding pin are separated by approximately ¾ inches resulting in an approximately 3/16 inch gap between the center shaft 20 and the sliding pin 32 for capturing an end of the strap. The knob 38 is preferably offset from the center shaft 20 by the arm 36 by approximately 4 7/23 inches.

Figure 12:
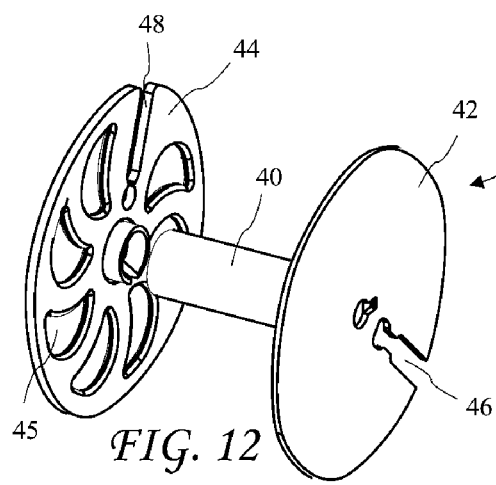
FIG. 12 is a perspective view of a spool according to the present invention.
Figure 13C:
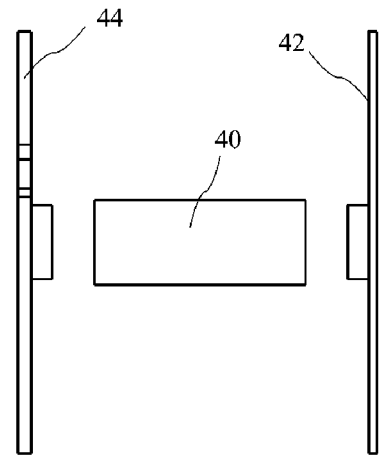
FIG. 13C is a top view of the end disks and the spool center of the spool according to the present invention.
Figure 13B:
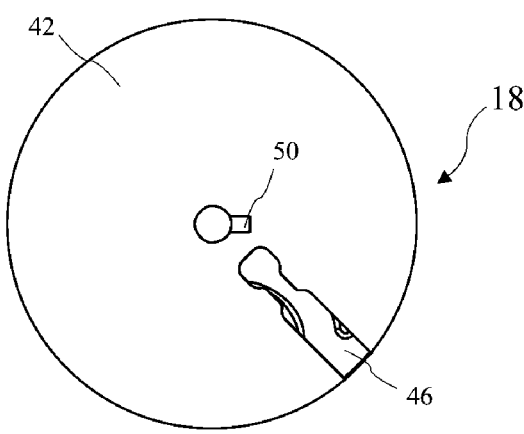
FIG. 13B is a side view of the end disks and the spool center of the spool according to the present invention.
Figure 13A:
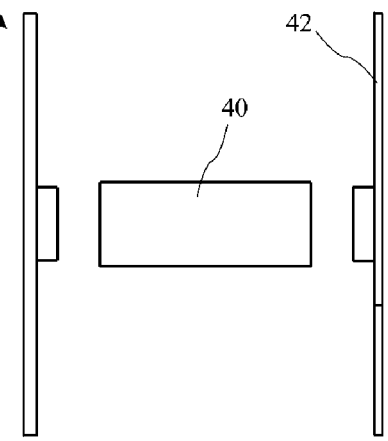
FIG. 13A is a front view of end disks and a spool center of the spool according to the present invention.

A perspective view of the spool 18 according to the present invention is shown in FIG. 12, a front view of the spool 18 is shown in FIG. 13A, a side view of the spool 18 is shown in FIG. 13B, and a top view of the spool 18 is shown in FIG. 13C. The spool 18 includes three parts, an inside disk 42, a spool center 40, and an outside disk 44 opposite the inside disk 42. The inside disk 42 includes a slot 46 for engaging the end of a cord for holding the cord while winding the cord onto the spool 18. The inside disk 42 also includes a notch (or passage) 50 for engaging the sliding pin 32 to cause the spool 18 to rotate with the arm 36. The outside disk 44 includes a second slot 48 also for receiving the end of a cord. The slots 46 and 48 are preferably approximately ⅜ inches and approximately ¾ inches wide for receiving different sized cords. Either or both disks 42 and 44 may be solid or include cutouts 45.

The disks 42 and 44 have a disk diameter of preferably approximately ten inches and thickness of preferably approximately ¼ inches, and the spool 18 is preferably approximately 5½ inches wide.

Figure 14:
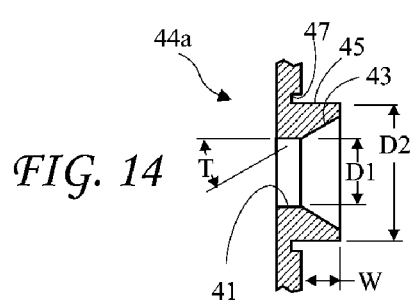
FIG. 14 is a detailed view of a mating portion of the end disks of the spool according to the present invention.

A detailed cross-sectional view of an inside facing center portion 44a of the disks 42 and 44 is shown in FIG. 14. The center portion has cylindrical bore 41 with diameter D1 opening to a mouth 43 at a taper T. The diameter D1 is preferably approximately ⅞ inches, the taper T is preferably approximately 30 degrees and provides self centering or aligning when the spool 18 is installed over the center shaft 20. The center portion has a shoulder 45 having an outside diameter D2 of preferably approximately 1¾ inches and a width W of preferably approximately one half inch. A square cross-section recess 47 is cut into the disks 42, 44 for seating the cylindrical spool center 40, the square cross-section recess 47 is preferably approximately ⅛ inch deep and preferably approximately ⅛ inch wide. The disks 42, 44 are pushed onto the spool center 40 and retained by an interference fit. The disks 42, 44 and center 40 are preferably made from plastic.

Figures 15A, 15B, 15C:
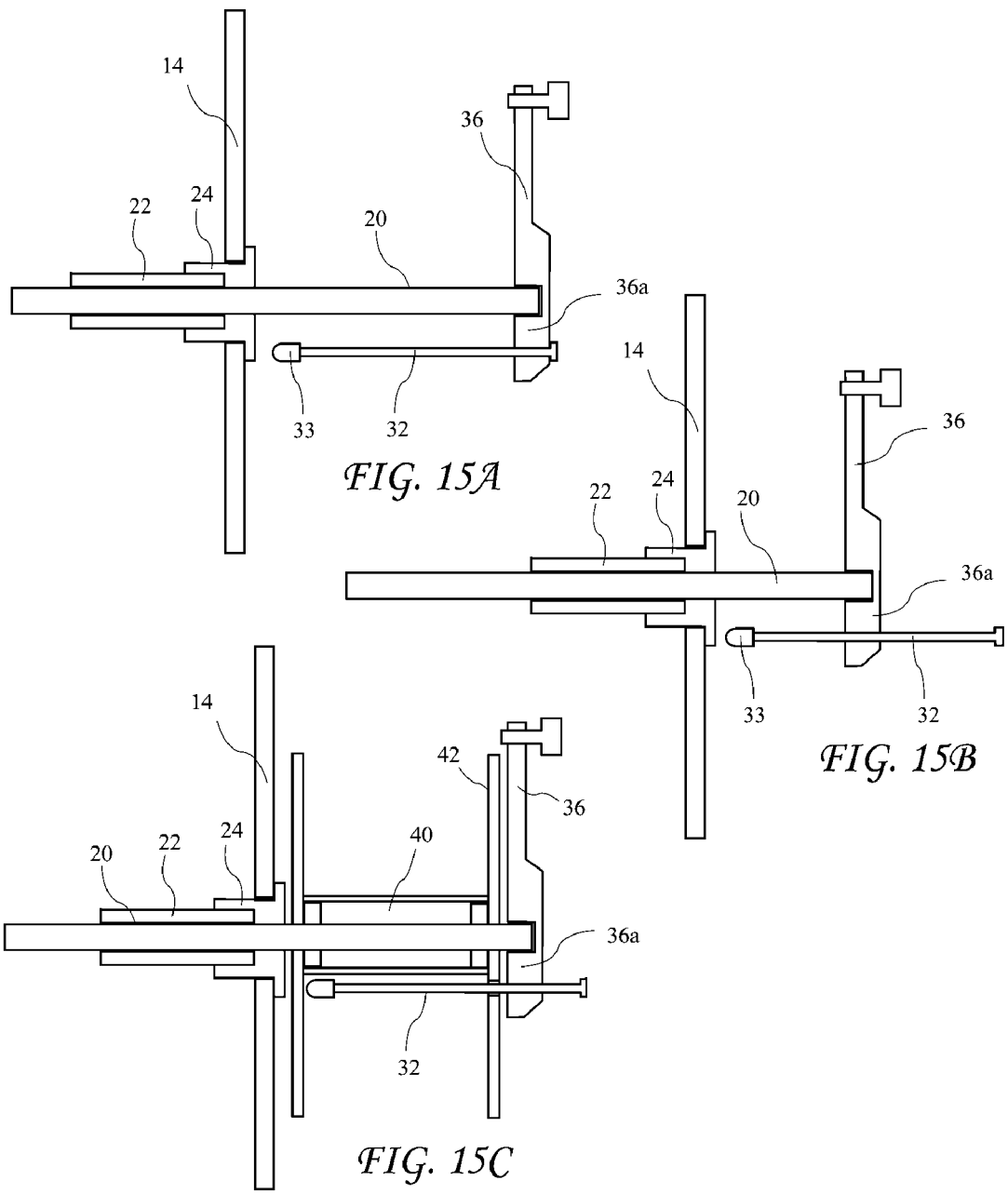
FIG. 15A shows the strap winder opened to accept a wider strap.
FIG. 15B shows the strap winder closed to accept a narrower strap.
FIG. 15C shows the spool residing over the center shaft.

The strap winder 10a is shown opened to accept a wider strap in FIG. 15a and shown closed to accept a narrower strap in FIG. 15B, and is shown with the spool 18 residing over the center shaft 20 in FIG. 15C. A pin cap 33 resides on the inside end of the sliding pin 32 to resist or prevent the sliding pin 32 from being completely withdrawn from the arm 36. The sliding pin 32 facilitates simple adjustment of the separation of the face plate 14 from the handle arm 36 to accommodate different width straps. The ability to adjust the width of the winder 10a allows winding tight and even coils which are not possible when a narrow strap is wound on a wide winder. Such tight and even coils are easier to store and to pay out for later use. The spool 18 may be placed over the center shaft 20 and the sliding pin 32 inserted through the notch 50 (see FIG. 13B) to couple rotation of the handle arm 36 with rotation of the spool 18.

A perspective view of an unwinding handle 60 according to the present invention is shown in FIG. 16, a side view of the unwinding handle 60 is shown in FIG. 17A, an end view of the unwinding handle 60 is shown in FIG. 17B, and a top view of the unwinding handle 60 is shown in FIG. 17C. The unwinding handle 60 includes a grip 64 and a hub 62 separated by a handle arm 66. The hub 62 includes a passage 63 having an inside diameter providing an interference fit to the center shaft 20 so that center shaft 20 may be detached from the handle arm 36 and withdrawn from the face plate 14 and engaged with the unwinding handle 60 for releasing a strap or cord which was previously wound onto the center shaft 20.

The unwinding handle 60 preferably has an overall outside radius of preferably approximately 7¼ inches and the grip 64 has an overall length of preferably approximately 5⅝ inches.

Figure 18:
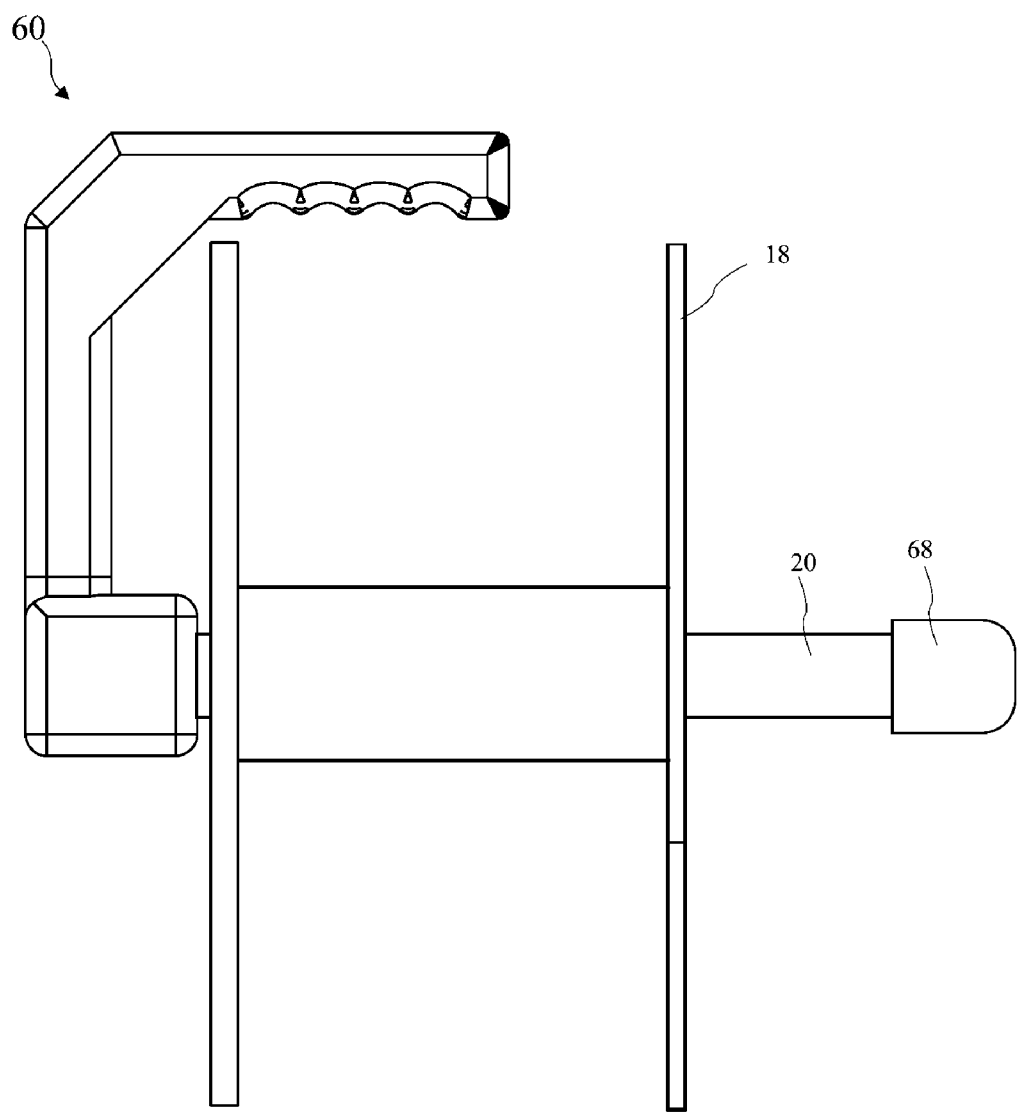
FIG. 18 shows the spool on the unwinding handle according to the present invention.

The spool 18 is shown on the unwinding handle 60 in FIG. 18. The center tube 20 is shown inserted into the passage 63 of the hub 62 of the unwinding handle 60 using the interference fit. The spool 18 slides over the center tube 20 with a loose fit allowing the spool 18 to freely rotate on the center tube 20, and a cap 68 placed over the end of the center tube 20 to retain the spool 18. The cap 68 and center tube 20 are preferably plastic and the cap is held on the center tube 20 by an interference fit, and more preferably, the cap 68 and center tube 20 are standard ⅞ inch schedule 40 PVC products.

While the chest plate 12 is described above to include two slots for engaging a belt or harness, the chest plate may also be attached to a belt or harness by other means including hooks, screws, bolts, and the like, and a winder having any means for carrying the harness on a user's body is intended to come within the scope of the present invention. Further, while dimensions of various elements of the winder are cited as preferred, those skill in the art will recognize that the dimensions may be scaled up or down as may be convenient for manufacturing or use and still come within the scope of the present invention. Further, while preferred materials are disclosed, those skill in the art will recognize that a winder may be made from a variety materials as may be convenient for manufacturing or use and still come within the scope of the present invention While the invention herein disclosed has been described by means of specific embodiments and applications thereof, numerous modifications and variations could be made thereto by those skilled in the art without departing from the scope of the invention set forth in the claims.

We claim:
1. A winder comprising:
a non-rotating face plate having an inward facing face and an outward facing face opposite to the inward facing face;
a bushing portion of the face plate approximately centered on the faces, the bushing having a passage and the passage having a centerline approximately orthogonal to the inward facing face;
a handle assembly having:
   a center shaft having a proximal end and a distal end opposite the proximal end, the distal end passing through the bushing in the face plate;
   an handle arm having a shaft end attached to the center shaft at the proximal end of the center shaft; and
   a sliding pin residing parallel to the center shaft and also slidably engaging the shaft end of the handle arm,
wherein the center shaft is slidable through the bushing to adjust the separation of the handle arm from the inward facing face of the face plate.

2. The winder of claim 1, wherein the inward facing face provides a first side boundary for a strap wound by the winder and an opposing face of the handle arm provides a second side boundary for the strap.

3. The winder of claim 1, further including a tubular handle attached to the outward facing face of the face plate and coaxial with the passage of the bushing of the face plate, the distal end of the center shaft reaching into the tubular handle and rotatable inside the tubular handle.

4. The winder of claim 1, wherein the center shaft is detachably attached to the handle arm using an interference fit.

5. The winder of claim 1, wherein the sliding pin is separated from the center shaft by approximately 3/16 inches for capturing an end of the strap.

6. A winder comprising:
   a non-rotating face plate having an inward facing face and an outward facing face opposite to the inward facing face, the face plate including a tubular handle fixedly attached to the outward facing face and having a bore orthogonal to the inward facing face of the face plate;
   a handle assembly having:
      a center shaft having a proximal end and a distal end opposite the proximal end, the distal end passing through the tubular handle of the face plate and freely rotating inside the tubular handle;
      an handle arm having a shaft end detachably attached to the center shaft by an interference fit at the proximal end of the center shaft; and
      a sliding pin residing parallel to the center shaft and also slidably engaging the shaft end of the handle arm,
   wherein the center shaft is slidable through a bushing to adjust the separation of the handle arm from the inward facing face of the face plate and the sliding pin is slidable in the shaft end of the handle arm, the sliding pin.

7. A winder comprising:
   a chest plate wearable by a user;
   a non-rotating face plate attached orthogonally to the chest plate and having an inward facing face and an outward facing face opposite to the inward facing face, the face plate including a tubular handle fixedly attached to the outward facing face and having a bore orthogonal to the inward facing face of the face plate;
   a handle assembly having:
      a center shaft having a proximal end and a distal end opposite the proximal end, the distal end passing through the tubular handle of the face plate and freely rotating inside the tubular handle;
      an handle arm having a shaft end detachably attached to the center shaft by an interference fit at the proximal end of the center shaft; and
      a sliding pin residing parallel to the center shaft and also slidably engaging the shaft end of the handle arm,
   wherein the center shaft is slidable through a bushing to adjust the separation of the handle arm from the inward facing face of the face plate and the sliding pin is slidable in the shaft end of the handle arm, the sliding pin.

\* \* \* \* \*